Oct. 6, 1931.  P. J. BIRKMEYER ET AL  1,826,379
TRANSFER MEANS FOR BELT CONVEYERS
Filed Nov. 12, 1929  3 Sheets-Sheet 1
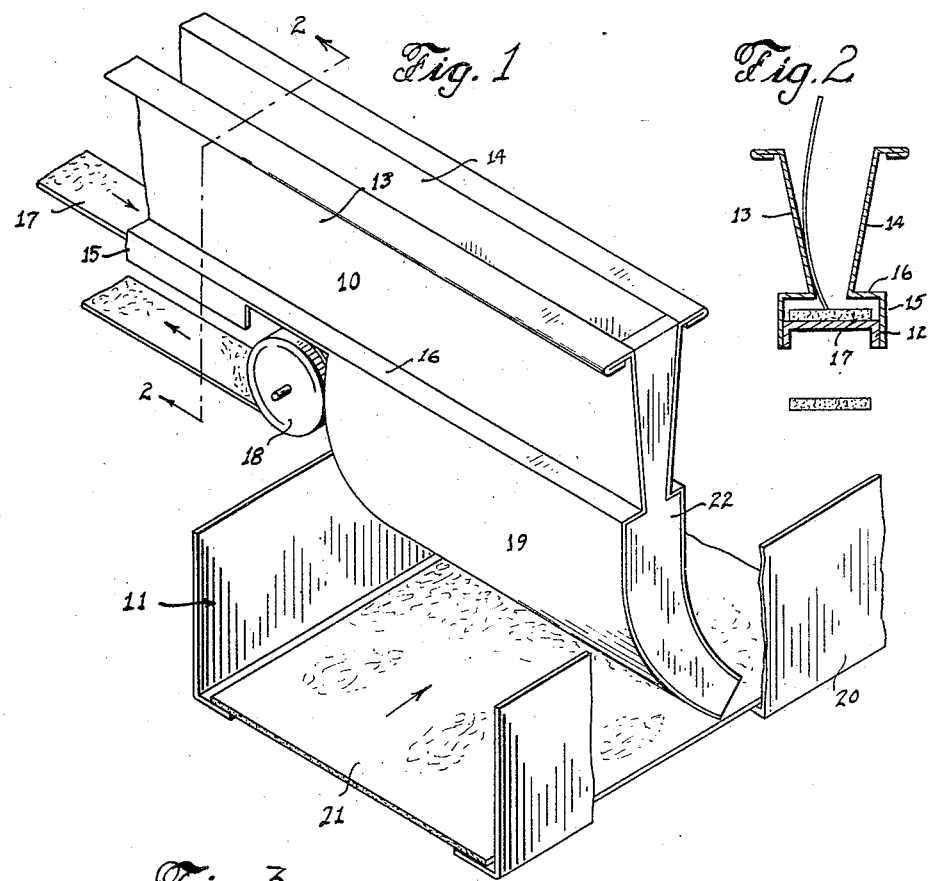
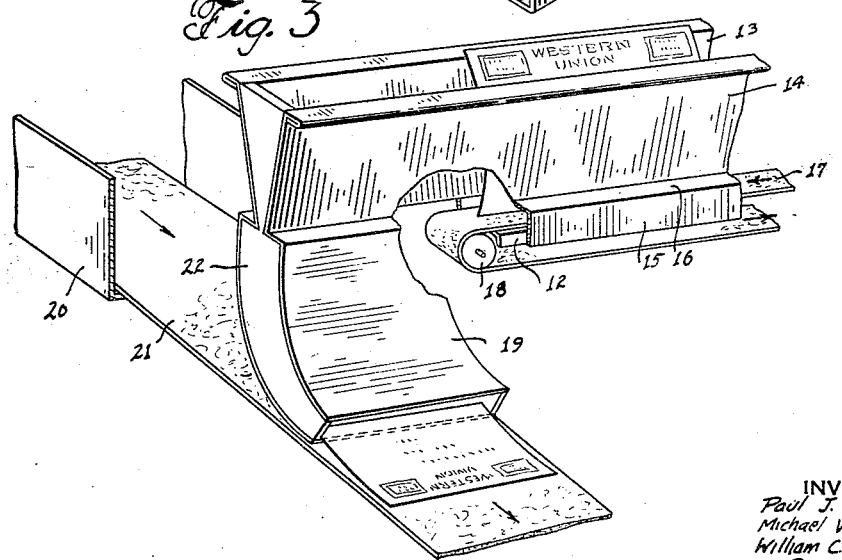
INVENTORS:
Paul J. Birkmeyer
Michael V. Creedan
William C. Chadbourne
Eugene C. Brown
ATTORNEY

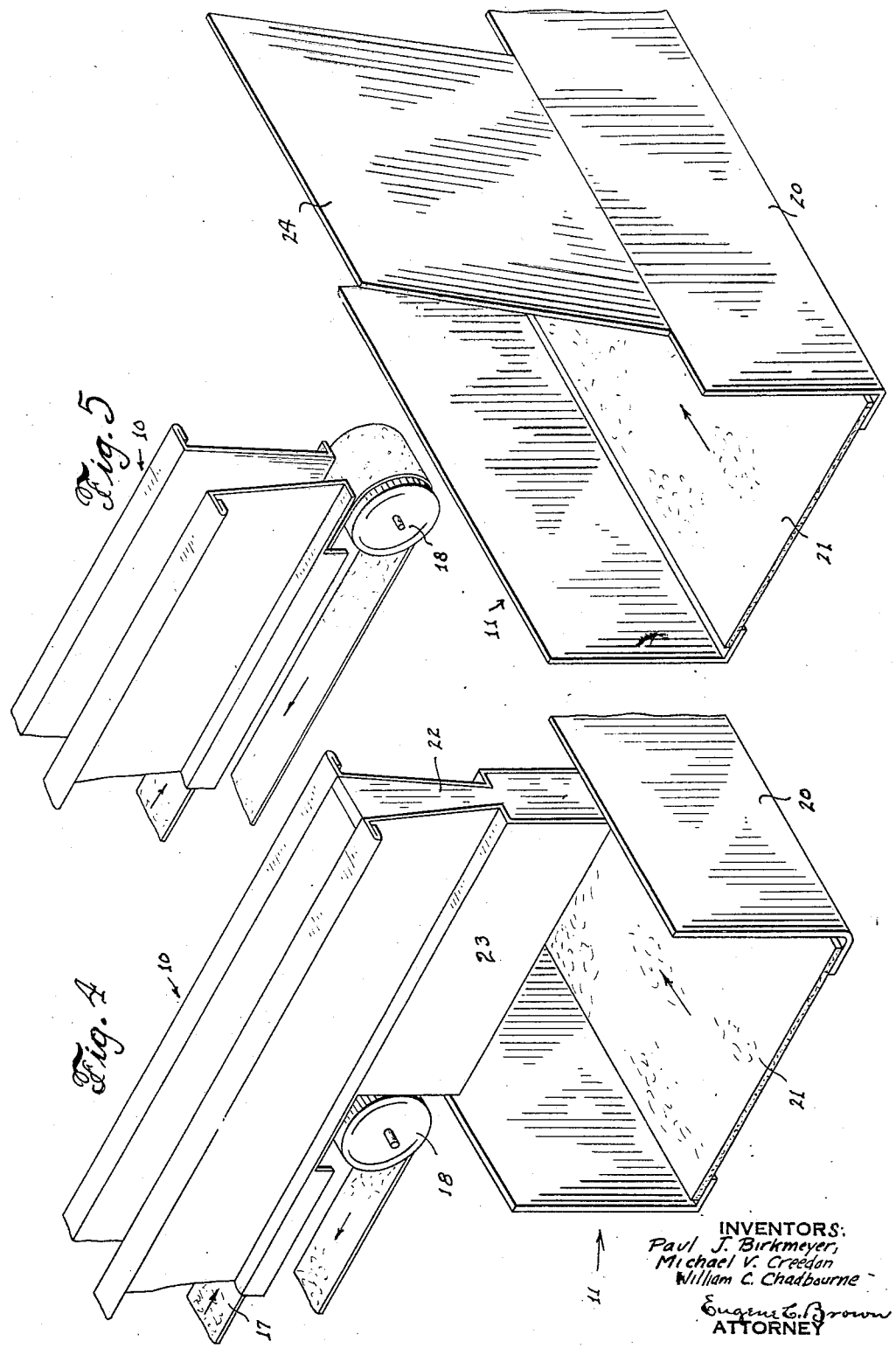

Oct. 6, 1931. P. J. BIRKMEYER ET AL 1,826,379
TRANSFER MEANS FOR BELT CONVEYERS
Filed Nov. 12, 1929 3 Sheets-Sheet 3
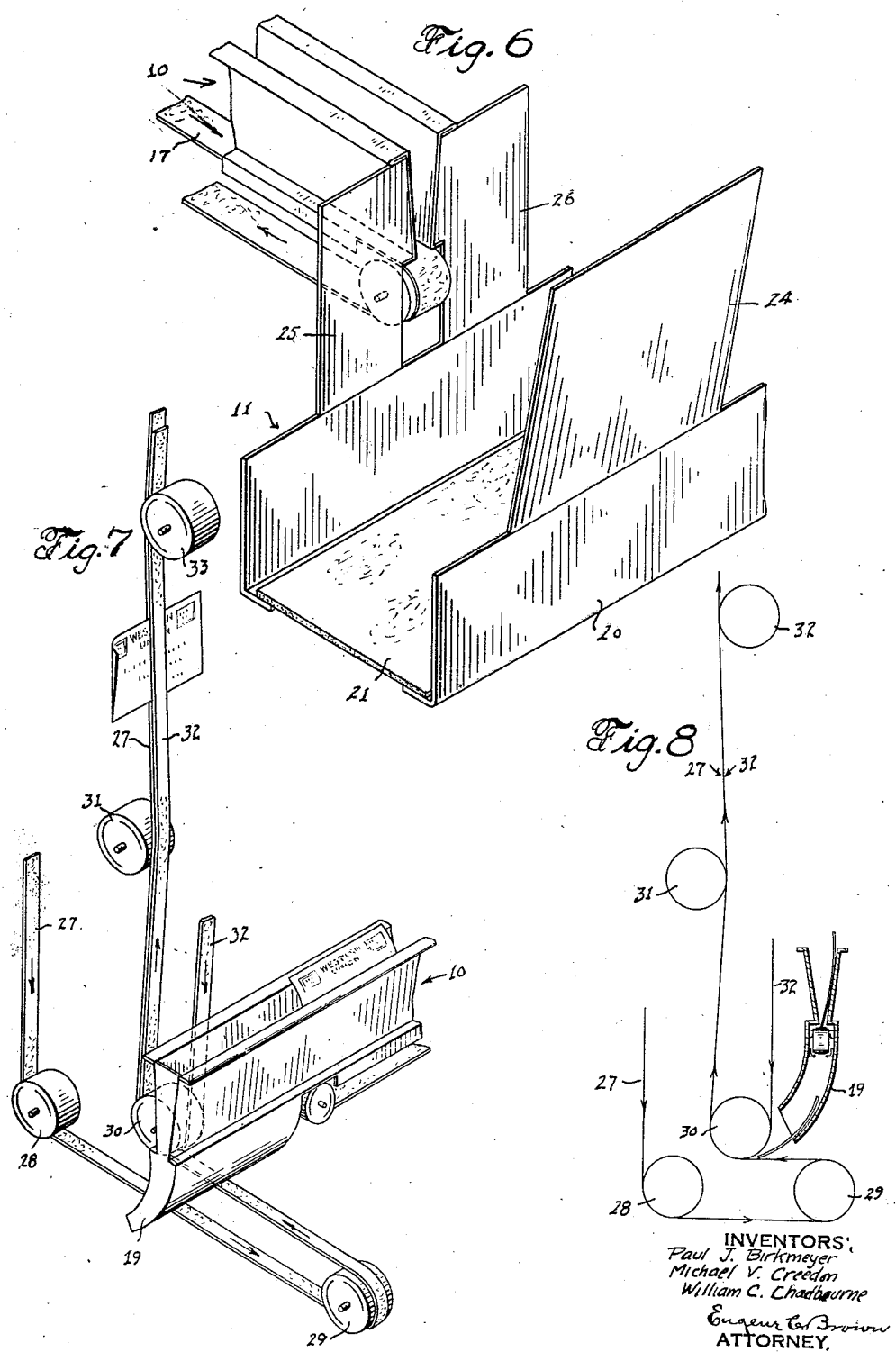

Patented Oct. 6, 1931

1,826,379

UNITED STATES PATENT OFFICE

PAUL J. BIRKMEYER, OF BROOKLYN, NEW YORK, MICHAEL V. CREEDON, OF WESTFIELD, NEW JERSEY, AND WILLIAM C. CHADBOURNE, OF ELMHURST, NEW YORK, ASSIGNORS TO THE WESTERN UNION TELEGRAPH COMPANY, OF NEW YORK, N. Y., A CORPORATION OF NEW YORK

TRANSFER MEANS FOR BELT CONVEYERS

Application filed November 12, 1929. Serial No. 406,674.

This invention relates to a conveyer and has special reference to an endless belt conveyer for sheet articles such as telegrams, letters and the like in which the articles are transported in a substantially vertical or on edge position.

In a copending application of d'Humy, Birkmeyer and Griffith, filed March 13, 1929, Serial No. 350,750 and entitled Belt conveyers, a conveyer system of this nature is described. Briefly such conveyer comprises a substantially V-shape open bottom trough having a rectangular conduit at the bottom thereof of greater width than the trough and extending under the edge thereof, through which the belt travels. The articles to be transported are disposed in the trough in a vertical position and are carried along the trough in such position. This form of conveyer is particularly advantageous for transporting telegrams from one part of a central telegraph office to another, since the telegrams may be placed in the trough with their headings uppermost in such position as to render the address, routing data, etc., visible as the telegrams travel along the conveyer. The operators or attendants to whom the telegrams are to be conveyed for subsequent handling and who are disposed along the path of the conveyer can thus readily determine which of the telegrams are intended for them without the need of first removing them from the conveyer.

It is desirable in many instances to employ in addition to the V-trough conveyer, conveyers of different forms such as an ordinary wide belt conveyer in which the telegrams are carried in a flat or horizontal position or a double strap conveyer in which the telegrams are conveyed between two contacting straps so as to be gripped therebetween, the telegrams being automatically transferred from one form of conveyer to another.

Thus, for instance, a number of V-trough conveyers may form feeder runs for and be arranged angularly with reference to a main conveyer of the wide belt type upon which the telegrams are carried in a flat position and from which they may be removed by the various attendants disposed along the main conveyer.

One of the objects of the present invention is to provide a connection between such a V-trough conveyer and a second angularly disposed conveyer for automatically transferring the articles being transported, from the former to the latter.

Another object is to provide such a transfer connection which will cause the telegrams or similar articles to be disposed or fed on to the second conveyer in a definite position relative to their position in the V-trough conveyer, as for instance, face up with the headings running in the same direction.

Other objects and advantages will appear from the following description taken in connection with the drawings and appended claims.

In order that the invention may be fully understood, reference will now be had to the accompanying drawings in which;

Figure 1 is a perspective view of the delivery end of the V-trough conveyer associated with a wide belt conveyer;

Figure 2 is a section on the line 2—2 of Figure 1;

Figure 3 is a perspective view partly cut away, viewed from the opposite side of the conveyer from Figure 1;

Figures 4, 5 and 6 are perspective views similar to Figure 1 but showing modified constructions of the delivery end of the V-trough conveyer;

Figure 7 is a perspective view of a V-trough conveyer discharging into a double strap conveyer; and Figure 8 shows a sectional view of the V-trough conveyer in its relation to the strap conveyer; the latter being shown in elevation.

Referring first to Figures 1, 2 and 3, we have shown a V-trough conveyer 10 discharging into a wide belt conveyer 11, in the latter of which the telegrams are transported in a substantially flat or horizontal position. The V-trough conveyer is disposed slightly above the conveyer 11 and at an angle thereto and may comprise one of a number of feeder conveyers discharging into the conveyer 11.

The V-trough conveyer comprises a substantially horizontal inverted channel 12 having a pair of side plates 13 and 14 secured thereto. The side plates extend vertically above the channel at 15, then horizontally inward towards each other at 16 and thence vertically upward and divergently to form a substantially V-shape trough. The channel 12 together with the parts 15 and 16 of the side plates form a substantially rectangular conduit through which the conveyer belt 17 travels. The belt 17 adjacent the end of the conveyer passes around a pulley 18 and returns parallel to the operating run thereof. The channel 12 terminates in advance of the roller 18 and the side plates 13 and 14 are extended beyond the roller to the opposite side of the wide belt conveyer 11. A chute 19 depends from the extended ends of the side plates and is curved in the direction of travel of the wide belt so as to direct the telegrams or other articles being conveyed along the V-trough conveyer on to the belt conveyer 11 in a substantially horizontal position. The wide belt conveyer is provided with vertical sidewalls 20 at each side of the belt 21 to prevent the articles being conveyed from leaving the belt and a closure member or abutment 22 is provided at the ends of the extended portion of the side plates 13 and 14 and the chute 19 to prevent the telegrams from overrunning the conveyor 11, due to momentum, air currents, or the like.

In the operation of the conveyer system the telegrams T are deposited in the V-trough conveyer with the headings upward and facing the front, as viewed in Figure 3, and are transported along the conveyer in this position so that the addresses or other data is visible to the operators or attendants positioned alongside the conveyer. As the telegrams reach the end of the conveyer they drop through the chute 19 and are directed by the curved portion thereof onto the flat belt 21 substantially horizontally with the face side uppermost in such a position that the addresses or other information appearing on the telegrams may be readily observed without first removing the telegrams from the conveyer.

In Figure 4 we have shown a similar arrangement in which the chute, instead of being curved, terminates adjacent the top of the trough of the wide belt conveyer so that the telegrams drop freely from the end of the V-shape trough onto the conveyer 11. The bottom end of the depending portion 23 of the trough may be disposed at such distance from the surface of the belt 21 that the lower ends of the telegrams engage the belt and are carried forward thereby before the upper ends of the telegrams are freed from such depending portion. This causes the telegrams to fall face upward upon the belt 21.

In Figure 5 is shown a modification in which the V-shape trough terminates adjacent the rear edge of the conveyer 11 a baffle 24 extending upwardly from the other edge of the conveyer 11, opposite the V-shape trough to prevent the telegrams from overrunning conveyer 11.

In Figure 6 a pair of baffle plates 25 and 26 are provided at the discharge end of the V-trough to prevent interference with the transfer of the telegrams into the flat belt conveyer by disturbing air currents. The construction is otherwise similar to Figure 5.

In Figures 7 and 8 the V-trough conveyer is shown discharging into a double strap conveyer. The double strap conveyer comprises two separate endless straps having their operating runs in contact between which the telegrams are carried. One of the endless straps 27 passes around pulleys 28, 29 and 30 in the direction indicated by the arrows and travels vertically upward in contact with a pulley 31. The other strap 32 also passes around the pulley 30 and thence vertically upward in contact with the strap 27 and in contact with a guide pulley 33. The horizontal outlet of the chute 19 terminates at the advancing side of the pulley 30 at the point of initial contact of the straps 27 and 32 so that the telegrams are directed by the chute in between the two straps. It will be noted that the straps are narrow compared to the telegrams and that the chute 19 is arranged so that the straps are substantially central thereof, thus causing the telegrams to be fed into the straps so as to project equally from each side thereof. It will be understood that the chute 19 is only slightly wider than the telegram blanks.

Obviously, various other modifications and changes can be made in the construction of the conveyer without departing from the invention and we do not desire to be limited to the exact details shown.

What we claim is:—

1. In a conveyer system, a conveyer adapted to transport sheet material in a substantially vertical position, a second conveyer disposed at an angle to said first conveyer, a belt for said first conveyer terminating adjacent the edge of the second conveyer, a guiding trough for said first conveyer extending beyond said belt and terminating at the opposite side of said second conveyer, said trough having a discharge outlet in the bottom thereof above said second conveyer.

2. In a conveyer system, a conveyer adapted to transport sheet material in a substantially vertical position, a second conveyer disposed at an angle to said first conveyer, a belt for said first conveyer terminating adjacent the edge of the second conveyer, a guiding trough for said first conveyer extending beyond said belt and terminating at the opposite side of said second conveyer, said trough having a discharge outlet in the bottom thereof above said second conveyer and a chute depending from said trough for depositing said material onto said second conveyer.

3. In a conveyer system, a conveyer adapted to transport sheet material in a substantially vertical position, a second conveyer disposed at an angle to said first conveyer, a belt for said first conveyer terminating adjacent the edge of the second conveyer, a guiding trough for said first conveyer extending beyond said belt and terminating at the opposite side of said second conveyer, said trough having a discharge outlet in the bottom thereof above said second conveyer and a chute depending from said trough shaped so as to deposit said material onto said second conveyer in the direction of travel thereof.

In testimony whereof we affix our signatures.

PAUL J. BIRKMEYER.
MICHAEL V. CREEDON.
WILLIAM C. CHADBOURNE.